T. S. DAVIS.

Piston-Packings.

No. 6,128. Reissued Nov. 10, 1874.

Witnesses.

Wm. Edwards.

Wm. R. Whitney

Inventor.

Thos S Davis
per James A Whitney
Atty.

THE GRAPHIC CO. PHOTO-LITH. 39 & 41 PARK PLACE, N.Y.

UNITED STATES PATENT OFFICE.

THOMAS S. DAVIS, OF JERSEY CITY, NEW JERSEY.

IMPROVEMENT IN PISTON-PACKINGS.

Specification forming part of Letters Patent No. 31,303, dated February 5, 1861; reissue No. 6,128, dated November 10, 1874; application filed August 14, 1874.

*To all whom it may concern:*

Be it known that I, THOMAS S. DAVIS, of Jersey City, in the county of Hudson and State of New Jersey, have invented a new and useful Improvement in Piston-Valves and other Pistons; and I do hereby declare that the following is a full, clear, and exact description of the same, reference being had to the accompanying drawings, forming part of this specification, in which—

Figure 1:
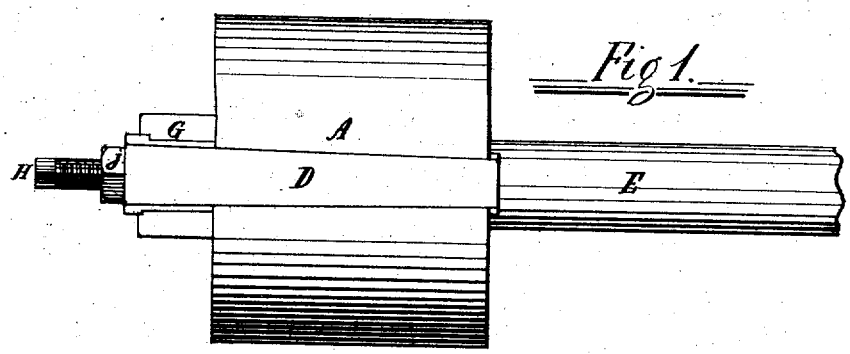
Figure 2:
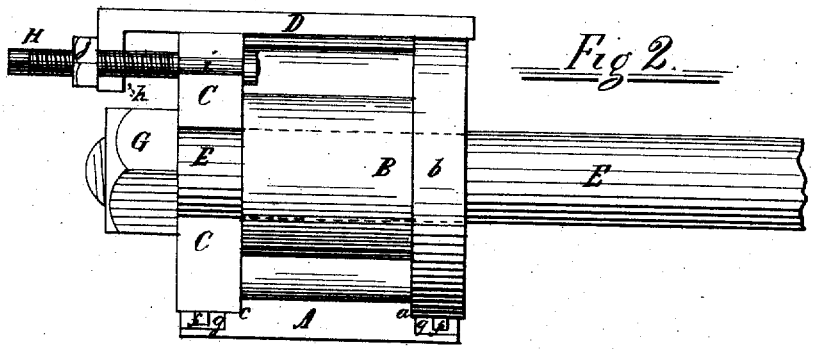
Figure 3:
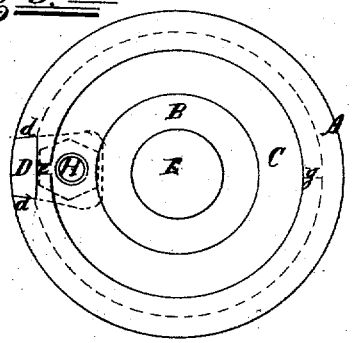

Figure 1 is a side view of a piston-valve constructed according to my invention. Fig. 2 is a central section of the same. Fig. 3 is a transverse section of the same, and Fig. 4 is an end view of the packing-ring.

This invention is more particularly designed for piston-valves, but it may also be used in other kinds of pistons. It consists in certain novel means whereby the piston is made as nearly as possible like a solid block, and yet capable of adjustment to fit the cylinder in which it works, as required, by expanding or setting out the valve to compensate for wear, in a non-elastic manner.

To enable others to make and use my invention I will proceed to describe its construction and operation.

Figure 4:
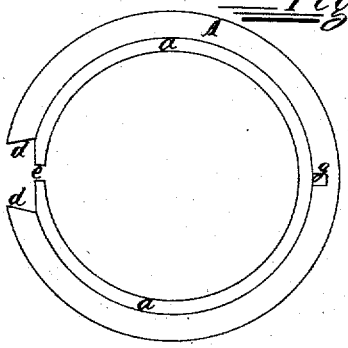

A is a single ring, of cast-iron, brass, or other metal, of a depth equal to the whole depth of the piston turned externally to a cylindrical form to fit the cylinder, and having its interior turned out at one side concentrically to its exterior, as shown at *a a* in Figs. 2 and 4, for the reception within it of the flange *b* of the solid head B of the piston, and turned out at the opposite side in a similar manner, as shown at *c* in Fig. 2, for the reception of the follower C. The said ring has cut in its exterior, at any point in its circumference, a taper dovetail groove, *d d*, for the reception of a dovetail wedge, D, which is to be movable parallel with the piston-rod, and from the middle of the back of the said groove the said ring is cut through, as shown at *e* in Figs. 2, 3, and 4, to permit it to be set out by the dovetail wedge, the outer face of which combines with the periphery of the ring, to make a complete cylinder. The solid flanged head B is driven tightly on or otherwise firmly secured to the rod, and the follower C is fitted to the rod, and secured by a nut, G, fitted to a screw-thread on the rod, the said nut holding it close up to the face of the head B and to the shoulder, at the back of the recess *c*. The flange B has projecting from its periphery a short pin, *f*, to enter a notch, *g*, in the interior of the recess *a* of the ring, and the follower C has a similar pin to enter a similar notch in the recess *c*.

These notches and pins prevent the head B of the follower C and ring *a* from turning independently of each other. The head B and follower C are received entirely within the ring A, so that the peripherical surface of the piston is unbroken, except at the junction of the wedge B, and the piston is practically a solid non-elastic block, though it can be expanded and set out against the interior of its cylinder, as required to make it fit and compensate for wear, by means of the wedge D.

To provide for the convenient adjustment of the wedge D I employ a screw, H, screwing through a tapped hole in a lug, *h*, at one end of the wedge, and having a journal, *i*, so fitted to a bearing in the ring C as to be capable of turning freely, but not moving longitudinally. This screw is fitted with a jam-nut, *j*, to secure the wedge in any position in which it may have been adjusted.

Instead of dividing the ring in one place only, and using a single wedge, I propose in large pistons to divide the ring in three or more places, and use a corresponding number of wedges.

What I claim as my invention is—

1. The combination, in a piston-valve or other piston, of a divided ring and a wedge, having its motion parallel with the axis of and flush with the periphery of said ring, for varying its diameter, substantially as specified.

2. In a piston-valve or other piston, constructed with a single expanding and adjustable ring, the combination of the head B and follower *c*, furnished to its interior, and one or more wedges, D, the whole arranged for joint operation, substantially as and for the purpose set forth.

THOS. S. DAVIS.

Witnesses:

JAMES A. WHITNEY,

WM. EDWARDS.